United States Patent
Thompson

(10) Patent No.: US 6,625,613 B2
(45) Date of Patent: Sep. 23, 2003

(54) AUTOMATIC GENERATION OF SQL FOR FRAME COMPLETION

(75) Inventor: William Thompson, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 307 days.

(21) Appl. No.: 09/794,487

(22) Filed: Feb. 26, 2001

(65) Prior Publication Data

US 2002/0120603 A1 Aug. 29, 2002

(51) Int. Cl.[7] .............................................. G06F 17/30
(52) U.S. Cl. .............................. 707/102; 707/3; 707/4
(58) Field of Search ................................ 707/1, 3, 102, 707/4, 5, 6, 103 R, 103 Y, 103 Z, 103, 104.1; 717/107, 116, 147

(56) References Cited

U.S. PATENT DOCUMENTS

| | | | | |
|---|---|---|---|---|
| 5,201,046 A | * | 4/1993 | Goldberg et al. | 707/100 |
| 6,016,497 A | * | 1/2000 | Suver | 707/3 |
| 6,035,275 A | | 3/2000 | Brode et al. | 704/275 |
| 6,044,347 A | | 3/2000 | Abella et al. | 704/274 |
| 6,411,951 B1 | * | 6/2002 | Galindo-Legaria et al. | 707/1 |
| 6,470,333 B1 | * | 10/2002 | Baclawski | 707/3 |
| 2002/0062312 A1 | * | 5/2002 | Gupta et al. | 707/3 |
| 2002/0083039 A1 | * | 6/2002 | Ferrari et al. | 707/3 |

OTHER PUBLICATIONS

M. Denecke, Interactive Systems, Inc. and A. Waibel, Interactive Systems, Labs.; "Integrating Knowledge Sources for the Specification of a Task–Oriented Dialogue System"; (Pittsburgh, Pa; pp. 33–39) (no date).

D.G. Bobrow, R.M. Kaplan, M. Kay, D.A. Norman, H. Thompson and T. Winograd; "Gus, A Frame–Driven Dialog System"; *Artificial Intelligence* 8 (1977), pp. 155–173.

* cited by examiner

*Primary Examiner*—Charles Rones
(74) *Attorney, Agent, or Firm*—James A. Lamb

(57) ABSTRACT

The current invention provides a method for managing a dialogue between a processing system and a user. It addresses the problem of inferring possible feature values by automatically generating an SQL query from a frame representation posting this query to a relational database containing the relevant domain knowledge, and updating the frame representation to reflect the results of this query. Because the method is not dependent on particular information of the domain utilizing the method, it can be readily implemented for any specific application which benefits from inferring possible feature values by extracting data from a database.

18 Claims, 2 Drawing Sheets

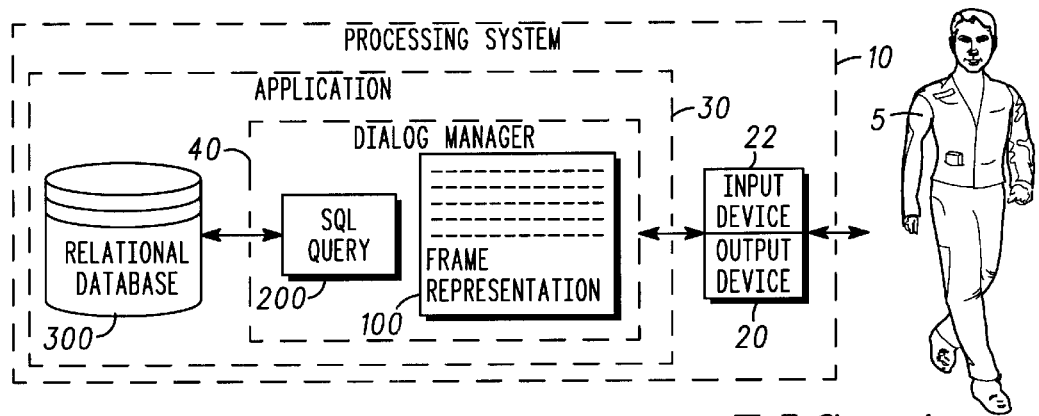
FIG. 1
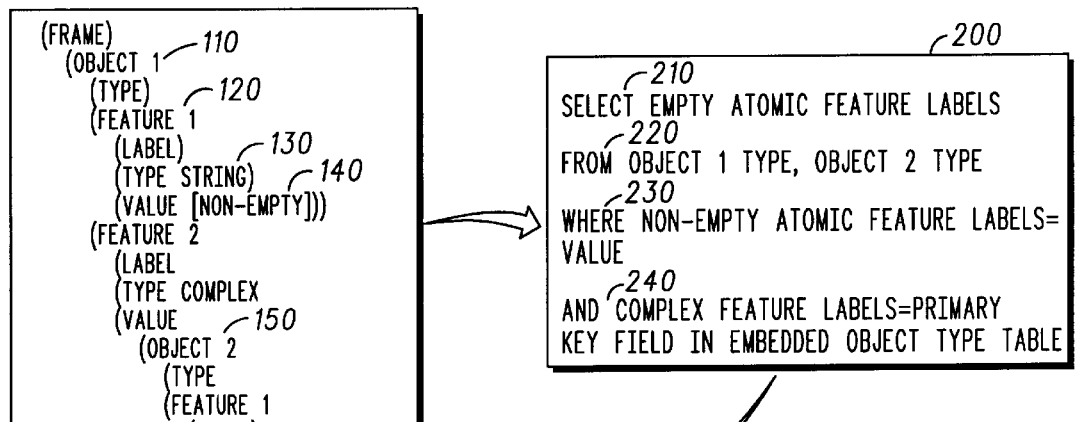
FIG. 2
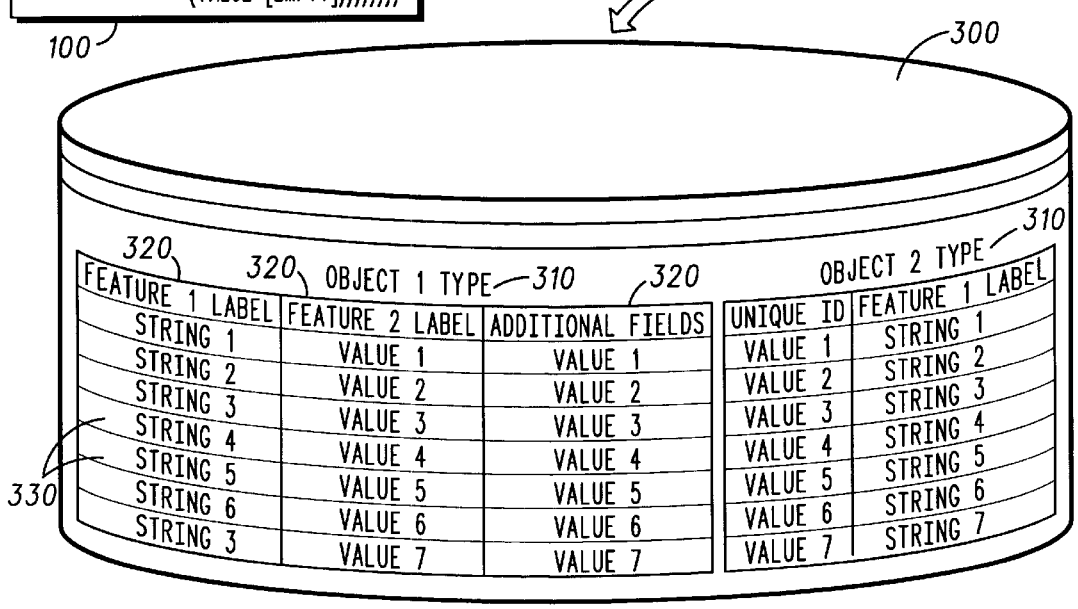

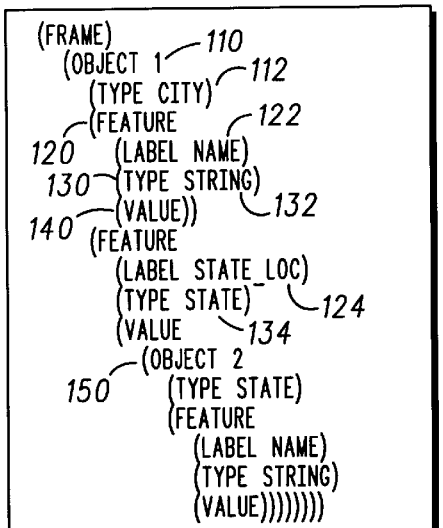

FIG. 3

```
200
210 — SELECT STATE.NAME FROM CITY, STATE
220 — WHERE CITY.NAME="CHICAGO"
230 — AND CITY.STATE_LOC=STATE.STATEID
```

FIG. 4A

```
200
210 — SELECT CITY.NAME FROM CITY, STATE
220 — WHERE STATE.NAME="CALIFORNIA"
230 — AND CITY.STATE_LOC=STATE.STATEID
```

FIG. 4B

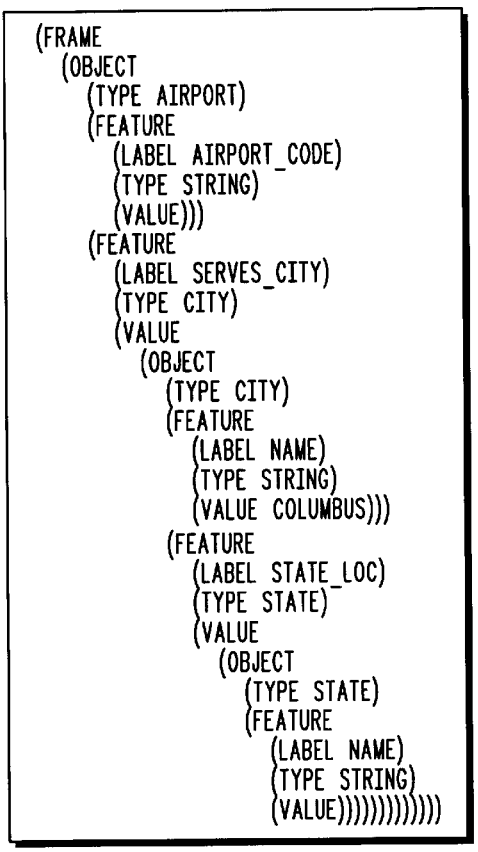

FIG. 5

```
SELECT AIRPORT.CODE, STATE.NAME
FROM AIRPORT, CITY, STATE
WHERE CITY.NAME="COLUMBUS"
AND AIRPORT.SERVES_CITY=CITY.CITYID
AND CITY.STATE_LOC=STATE.STATEID
```

FIG. 6

AUTOMATIC GENERATION OF SQL FOR FRAME COMPLETION

FIELD OF THE INVENTION

The present invention relates generally to dialogue processing systems, and more particularly to frame representations, SQL queries, and relational databases for dialog processing systems.

BACKGROUND

Natural language dialogs will play an increasingly important role as an interface to computer systems in general, and especially as an interface to the internet. Computer systems that will rely increasingly on natural dialog systems include automated call handlers, ticket machines, automatic teller machines (ATMs), reservation systems, and especially interactive on-line internet services. In fact, natural language dialogs will play an increasingly important role in any other system involving human-computer interaction which can be characterized as a dialogue. However, one of the barriers to the wide adoption of this technology is the lack of a domain-portable dialog system.

In natural language dialog systems it is common to represent domain knowledge in terms of frames, where a frame includes a set of feature-value pairs describing a domain object. Since a frame has a simple list of feature-value pairs, it does not contain any information regarding the interdependence of its feature values (feature values are interdependent because specifying the values of one or more features restricts the range of possible values for the other features). Given a frame representation, it is desirable that a dialog system be able to infer the possible values of features based upon the values of other features. However, it has been difficult to devise a technology capable of inferring values of features that is not domain specific.

To the extent that existing natural language dialog systems perform domain reasoning, they generally employ domain-specific heuristics, which involves hand-crafting a set of rules and procedures for each application domain. Simply stated, the problem is how to construct a computationally efficient domain-portable mechanism for using domain knowledge to specify the values of certain features of a frame representation based upon the values of other features in the same frame.

In contrast to previous attempts at dialog management systems which generally rely on domain specific heuristics, the current method is automatic and domain-independent, relying only upon the structure of the frame representation and associated rational database. It is also simple and efficient, relying upon standard and widely-available relational database technology.

BRIEF DESCRIPTION OF THE DRAWINGS

FIG. 1 shows an exemplary dialog processing system incorporating methods in accordance with the invention.

FIG. 2 shows the relationship between a frame, SQL query, and relational database, and sub-elements of FIG. 1.

FIG. 3 shows a frame representation for an exemplary City object in accordance with the present invention.

FIGS. (4A–4B) shows examples of SQL queries generated from the frame representation of FIG. 3.

FIG. 5 shows an example of a frame representation of an Airport object suitable for use in a travel reservation application.

FIG. 6 shows an example of an SQL query generated from the frame representation of FIG. 5.

DESCRIPTION OF THE PREFERRED EMBODIMENTS

The described embodiments provide methods for managing a dialogue between a processing system and a user which address problems relating to inferring possible feature values. As described, the system automatically generates an SQL query from a frame representation, posting this query to a relational database containing the relevant domain knowledge, and updating the frame representation to reflect the results of this query. Because the method is not dependent on particular information of the domain utilizing the method, it can be readily implemented for any specific application which benefits from inferring possible feature values by extracting data from a database.

As discussed further below, the system receives an input signal from the user and provides a frame representation of a primary object related to the input signal. The primary object has a typed feature structure including typed features with feature values including a first empty feature value of a first empty feature, a first complex feature value of a first complex feature, and a first non-empty feature value of a first non-empty feature. The first complex feature value is defined by a first embedded object. The first non-empty feature value is provided by the input signal.

In addition to the frame representation, the system provides a relational database having a structure isomorphic to the typed feature structure of the frame representation. That is, elements of the database, such as tables, fields, and field values, correspond to elements of the frame representation, such as objects, features, and feature values, respectively. The relational database includes a record with a field value corresponding to the first non-empty value of the frame representation and a record with a field value corresponding to a value of the first empty value of the frame representation.

The system then generates the SQL query for determining the first empty feature value from the first non-empty feature value based on the structural relationship of the relational database and the frame representation.

Next, the system runs the SQL query and sends the results of the SQL query to the processing system.

As illustrated below in conjunction with exemplary dialogue sequences, the disclosed techniques are suitable for use with a wide variety of other systems and in numerous alternative applications. For example, although illustrated using a system which conducts a spoken dialogue with a user, the invention is also suitable for use with non-spoken dialogues, such as dialogues in which a user types responses to system questions on a keyboard. The term "dialogue" as used herein refers generally to a conversation-like exchange involving two or more participants. An "agent" refers generally to a particular dialogue participant. The term "initiative" refers generally to a particular type of role which an agent can take on in a dialogue.

(a) Receiving an Input Signal from the User

FIG. 1 shows an exemplary dialogue processing system 10 in which methods for managing a dialog in accordance with the present invention may be implemented. Speech or text is entered into an input device 20, for example a cellular telephone or a personal digital assistant (PDA), from a human user 5. The speech or text is converted into an input signal with input information. Where speech is entered into the input device 20, a speech recognition unit associated with the input device 20 converts the speech signal into a computer recognizable input signal. The input signal is received by a processing system 10 including a software application 30 containing a dialog manager 40 which may include, for example, a browser customized for use with remote internet access devices, such as a text browser (e.g. Motorola WAP browser) or a voice browser (e.g. Motorola VoiceXML browser). In certain embodiments, the dialog manager 40 is a separate computer program from other software applications which utilize output from the dialog manager 40 to perform other functions.

The dialog manager 40 may be implemented in the form of a computer software program stored in memory of a computer which may be configured as a server. As will be described in greater detail below, the dialogue manager contains frame representations (hereinafter referred to as "frames") and provides a method for generating an SQL query 200 from the frames in response to the appropriate input signal according to the current invention. The SQL query searches a relational database 300 and generates a query result that is used to update the frames of the dialog manager. The dialog manager sends a signal, preferably as spoken words provided by, for example, a speech synthesizer, back to the user via an output device 22 which may be connected to, or part of, the input device 20.

The various elements of processing system 10 and the input/output device 20/22 may represent hardware and/or software elements of any system in which human-machine interaction is implemented in the form of a collaborative dialog, for example a personal computer, mainframe computer, microcomputer, workstation, server, ATM or, most preferably, a portable electronic device such as a cellular telephone or a personal digital assistant (PDA) connected to at least one server via the internet. Although the system 10 is configured to process speech signals, as discussed above alternative embodiments of the invention may utilize other types of input and output devices, such as a keyboard and a display monitor, respectively, to allow the system to conduct a non-spoken dialogue with a user. For example, the user portions of a dialogue may be entered into the system by the user via the keyboard, and the system responses may be displayed, with or without the corresponding user portions, on the display monitor.

The dialog management software for performing the method of the current invention can be written using a markup language, such as, but not limited to, the VoxML™ language (Motorola Inc., Schaumburg, Ill.). Typically, the programming language includes elements for composing frames that can generate SQL queries for associated relational databases according to the current invention.

(b) Providing a Frame Representation

As exemplified in FIGS. 2–3, the method of the described embodiment includes providing a frame representation 100 of the input signal. A frame is formalized as a typed feature structure, representing a description of a domain object 110, sometimes referred to herein as a primary object. A typed feature structure consists of a typed object which possesses a set of labeled features 120 with values 140. Feature types 130 come in two kinds: atomic and complex. An atomic type feature is defined as one with no features of its own, and includes such types as String, integer, or Boolean. A complex feature is defined as one with its own set of features. That is, a complex feature is defined as one with a value provided by an embedded object 150. Complex types model domain objects, and are defined by the designer of the domain model. Nesting types results in recursively specified frame representations. There is in principle no limitation on the number of types and attributes which can be included in a frame representation.

As an example, FIG. 3 shows a frame representation of an object 110 of type "City" 112. The city object in FIG. 3 has only two features, labeled "name" 122 and "state_loc" 124. The "name" 122 feature takes as its value an object of type String 132. The "state_loc" 124 feature takes as its value an object of type State 134. In FIG. 3, the "state_loc" feature is complex since it has its own set of features. In other words, its value is defined by an embedded object 150 of type state.

As exemplified by FIG. 3, an atomic feature value "Chicago" of the city.name feature has been provided by the user via the input signal described above, and entered at the city.name location in the frame 100 by the dialog manager. Therefore, city.name is a non-empty feature value of a non-empty city.name feature. A feature value for the state.name atomic feature has not been entered by the user and is an empty feature value of an empty state.name feature in the frame.

The frame representation format is general enough to capture arbitrarily complex frame representations, as long as they conform to the same representational format. FIG. 5 shows an "Airport" frame structure representing an airport domain object. This frame contains inside of it the same City object shown in FIG. 3. It is embedded as the value type of the Airport.serves_city feature. Therefore, the Airport.serves_city feature is a complex feature.

(c) Providing a Relational Database

The relational database 300 has a structure that is isomorphic to the typed feature structure of the frame representation 100. As shown in FIG. 2 for example, the relational database structure comprises tables 310 corresponding to object types, fields 320 corresponding to the feature labels, and field values 330 corresponding to feature values. The relational database tables representing embedded objects comprise a unique identifier field with values cross-referenced to a field of a table representing a corresponding complex feature value. Typically, there is a one to many relationship between records of a table representing an embedded object and a table representing an object with a complex feature whose values are provided by the embedded object.

The relational database of the present invention typically comprises one or more records with field values corresponding to non-empty and empty values of the frame representation. The field values associated with the one or more records of the relational database are typically entered and updated during set-up, support, and administration of the system. As described above, the user typically provides one or more non-empty values of the frame representation via the input signal which is generated by the input device. The relational database typically includes a first table that contains a record with a field value corresponding to a non-empty value of the frame representation and a second table that includes a record with a field value corresponding to an empty value of the frame representation. In certain preferred embodiments, the second table represents a first embedded object with a unique identifier field having values corresponding to values of a field of the first table representing a complex feature having a feature value defined by a feature value of the first embedded object. The relational database may include an unlimited number of additional tables representing additional embedded objects as long as the relational database tables representing embedded objects comprise a unique identifier field with values cross-referenced to a field representing a corresponding complex feature value of another table in the relational database.

Virtually any relational database 300 can be used with the current invention provided that it accepts SQL queries, or similarly structured queries. Non-limiting examples of relational databases that can be used with the current invention include Microsoft Access, Microsoft SQL Server, and Oracle. The database may be a local database or an on-line database. In one embodiment, the database is accessed using Open Database Connectivity (ODBC) by declaring the database as the data source using the Windows ODBC data source administrator and the Dialog Manager 40 is part of an internet-based application 30. In certain embodiments the database is accessed using Java Database Connectivity (JDBC).

(d) Generating an SQL Query

An SQL query is generated for determining empty feature values from non-empty feature values. For example, the SQL query may be constructed to determine a first object empty feature value using a first object non-empty feature value. The SQL query is based on the isomorphic relationship between the relational database and the frame representation. As shown in FIG. 2, the generation of an SQL query 200 from a frame representation 100 is performed by mapping it onto the three main components of an SQL query 200: (1) the FROM statement 220 specifying names of the tables holding relevant data, (2) the SELECT statement 210 specifying the relevant fields from these tables, and (3) the WHERE statement 230 specifying a set of restrictions on data values.

The SQL mapping procedure maps objects onto the database table names used in the FROM statement 220. The mapping procedure does one of two things with feature labels for atomic features. If the corresponding feature value in the frame is empty, it adds the label to the SELECT 210 statement of the query. Alternatively, if the corresponding feature value has a value, and is, therefore, non-empty, the mapping procedure uses the value information to construct a WHERE 230 statement restricting the query to records where the field name has this value. When feature value types are complex, the mapping procedure generates a join restriction 240 for the WHERE 230 statement for the field corresponding to the complex feature value and a primary key field of a database table corresponding to an embedded object that provides a value for the complex feature value.

As an example, two potential SQL queries generated from the City frame in FIG. 4 are shown in FIGS. 4B and 4C. The first of these queries, shown in FIG. 4A, would be generated if the City.name feature value were set by the dialog manager to "chicago" and the State.name feature value were unspecified. This may occur, for example, where the user speaks the word "chicago" into the input device in response to a query by the input device and the input device sends a signal representing the user input "chicago" to the dialog manager. In this example City.name is a non-empty atomic feature value, State.name is an empty feature value, and City.state_loc is a complex feature value. Therefore, the dialog manager generates the query as follows:

The empty State.name feature value is added to the SELECT statement 210 of the query;

The non-empty, City.name feature value is used to construct the WHERE statement 230 restricting the query to records where the city.name field value is "chicago;"

The complex City.state_loc feature is used to generate a join restriction 240 for the WHERE statement 230 of the City.state_loc field and a unique identifier State.id field in the state table.

The second query would be generated if the City.name feature value were unspecified, and the State.name feature value were set to "california." FIG. 4B shows how the mapping procedure generates different SQL queries depending on the specific frame context. That is, for this example City.name is an empty atomic feature value, State.name is a non-empty atomic feature value, and City.state_loc is a complex feature value.

The SQL mapping procedure is general enough to capture arbitrarily complex frame representations, as long as they conform to the same representational format. In the frame representation of FIG. 5, the City.name feature value is set to "columbus," while the Airport.code and State.name feature values are unspecified. That is, the Airport.code and State.name feature values are empty, atomic feature values. Given this structure, the SQL mapping procedure generates the query shown in FIG. 5. The mapping procedure generates two join restrictions instead of one (as in FIG. 4), since there is a relationship between both the Airport and City tables, and between the City and States tables.

(e) Running the SQL Query and Sending the Results of the SQL Query to the Processing System After the query is generated, it is performed by the dialog manager or other functions of the application and the results are used by the application or dialog manager to update frame representations. The updated frame representations are then used to initiate and/or effect an output signal which is sent to the output device.

In certain embodiments, the current invention is a relational database structured as described herein. In other embodiments, the current invention is a relational database and frame representation pair as described herein.

In certain embodiments, the current invention is the method for generating an SQL query from a frame representation as described herein.

The examples described herein illustrate the methods and devices of the invention. These examples are intended to be merely illustrative of the present invention, and not limiting thereof in either scope or spirit. Those skilled in the art will readily understand that variations of the components, methods, steps, and devices described in these examples can be used. All references cited herein are incorporated by reference in their entirety.

What is claimed is:

1. A system for processing a user dialog, said system comprising:
   (a) a frame representation of a series of objects with a typed feature structure comprising typed features with feature values including one or more empty feature values, one or more non-empty feature values, one or more complex feature values, and embedded objects providing values of a corresponding complex feature value, at least one of the one or more non-empty feature values being provided by an input signals; and
   (b) a relational database operable with the series of objects to provide a structure that is isomorphic to the typed feature structure of the frame representation.

2. The system for processing a user dialog of claim 1, the relational database comprising tables corresponding to the series of objects of the frame representation, fields corresponding to features of the frame representation, and field values corresponding to feature values of the frame representation, wherein the relational database further comprises one or more records providing each of the one or more empty feature values, one or more records providing each of the one or more non-empty feature values, and wherein one or more tables representing the one or more embedded objects comprises a unique identifier field with values corresponding to values of a field of a table representing a corresponding complex feature value.

3. A relational database comprising tables corresponding to objects of a frame representation, fields corresponding to features of the frame representation, and field values corresponding to feature values of the frame representation, a first table comprising a record with a field value corresponding to a non-empty value of the frame representation, and a second table comprising a record with a field value corresponding to a value of an empty value of the frame representation, wherein the second table represents a first embedded object with a unique identifier field having values corresponding to values of a field of the first table representing a complex feature having a feature value defined by a feature value of the first embedded object.

4. The relational database of claim 3, further comprising a third table representing a third object, wherein the first table represents a second embedded object with a unique identifier field that provides values of a third table field representing a complex feature having a value defined by a value of the second embedded object.

5. The relational database of claim 4, further comprising a fourth table representing a fourth object, wherein the third table represents a third embedded object with a unique identifier field that provides values of a fourth table field representing a complex feature having a value defined by a value of the third embedded object.

6. A method for generating an SQL query from a frame representation, the method comprising:

(a) receiving an input signal;

(b) providing a frame representation of a primary object with a typed feature structure comprising typed features with feature values including a first empty feature value of a first empty feature, a first complex feature value of a first complex feature, and a first non-empty feature value of a first non-empty feature, the first complex feature value being defined by a first embedded object, the first non-empty feature value being provided by the input signal;

(c) providing a relational database having a structure isomorphic to the typed feature structure of the frame representation the relational database comprising a record with a field value corresponding to the first non-empty value of the frame representation and a record with a field value corresponding to a value of the first empty value of the frame representation; and (d) generating the SQL query for determining the first empty feature value from the first non-empty feature value based on the structural relationship of the relational database and the frame representation.

7. The method of claim 1, wherein the method is domain portable.

8. The method of claim 1, wherein the relational database structure comprises tables corresponding to objects and fields corresponding to features.

9. The method of claim 8, wherein the SQL query maps objects to database tables of a FROM statement, empty atomic features to database fields of a SELECT statement, non-empty atomic features to database table values of a WHERE statement including a join restriction of a complex feature and a unique identifier field of a table representing an embedded object of the complex feature.

10. The method of claim 9, wherein the primary object and the first embedded object are mapped to the database tables of the FROM statement, wherein the first empty feature is mapped to a database field of the SELECT statement, wherein the first non-empty feature is mapped to the database table value of the WHERE statements and wherein the WHERE statement includes a join restriction of the first complex feature and a unique identifier field of a table representing the first embedded object.

11. The method of claim 10, wherein the frame representation further comprises a second complex feature being defined by a second embedded object, and wherein the WHERE statement further comprises a join restriction of the second complex feature and a unique identifier field of a table representing the second embedded object.

12. The method of claim 11, wherein the second complex feature is a feature of the first embedded object.

13. A method for managing a dialogue between a processing system and a user, the method comprising:

(a) receiving an input signal from the user;

(b) providing a frame representation of a primary object with a typed feature structure comprising typed features with feature values including a first empty feature value of a first empty feature, a first complex feature value of a first complex feature, and a first non-empty feature value of a first non-empty feature, the first complex feature value being defined by a first embedded object, the first non-empty feature value being provided by the input signal;

(c) providing a relational database having a structure isomorphic to the typed feature structure of the frame representation, wherein the relational database comprises the first empty feature value and the first non-empty feature value;

(d) generating the SQL query for determining the first empty feature value from the first non-empty feature value based on the structural relationship of the relational database and the frame representation;

(e) performing the SQL query to generate SQL query results; and (f) sending the SQL query results to the user.

14. The method of claim 13, wherein the relational database structure comprises tables corresponding to objects and fields corresponding to features.

15. The method of claim 14, wherein the SQL query maps objects to database tables of a FROM statement, empty atomic features to database fields of a SELECT statement, non-empty atomic features to database table values of a WHERE statement including a join restriction of a complex feature and a unique identifier field of a table representing an embedded object of the complex feature.

16. The method of claim 15, wherein the primary object and the first embedded object are mapped to the database tables of the FROM statement, wherein the first empty feature is mapped to a database field of the SELECT statement, wherein the first non-empty feature is mapped to the database table value of the WHERE statement, and wherein the WHERE statement includes a join restriction of the first complex feature and a unique identifier field of a table representing the first embedded object.

17. The method of claim 16, wherein the frame representation further comprises a second complex feature being defined by a second embedded object, and wherein the WHERE statement further comprises a join restriction of the second complex feature and a unique identifier field of a table representing the second embedded object.

18. The method of claim 17, wherein the second complex feature is a feature of the first embedded object.

* * * * *

UNITED STATES PATENT AND TRADEMARK OFFICE
CERTIFICATE OF CORRECTION

PATENT NO.    : 6,625,613 B2
DATED         : September 23, 2003
INVENTOR(S)   : Thompson, William It is certified that error appears in the above-identified patent and that said Letters Patent is hereby corrected as shown below:

Claim 7 depends from Claim 6
Claim 8 depends from Claim 6

Signed and Sealed this

Ninth Day of November, 2004

JON W. DUDAS
*Director of the United States Patent and Trademark Office*